Jan. 29, 1929.                W. UNDERWOOD                1,700,522
                             MOLD CONSTRUCTION
                          Filed Dec. 14, 1927          2 Sheets-Sheet 1
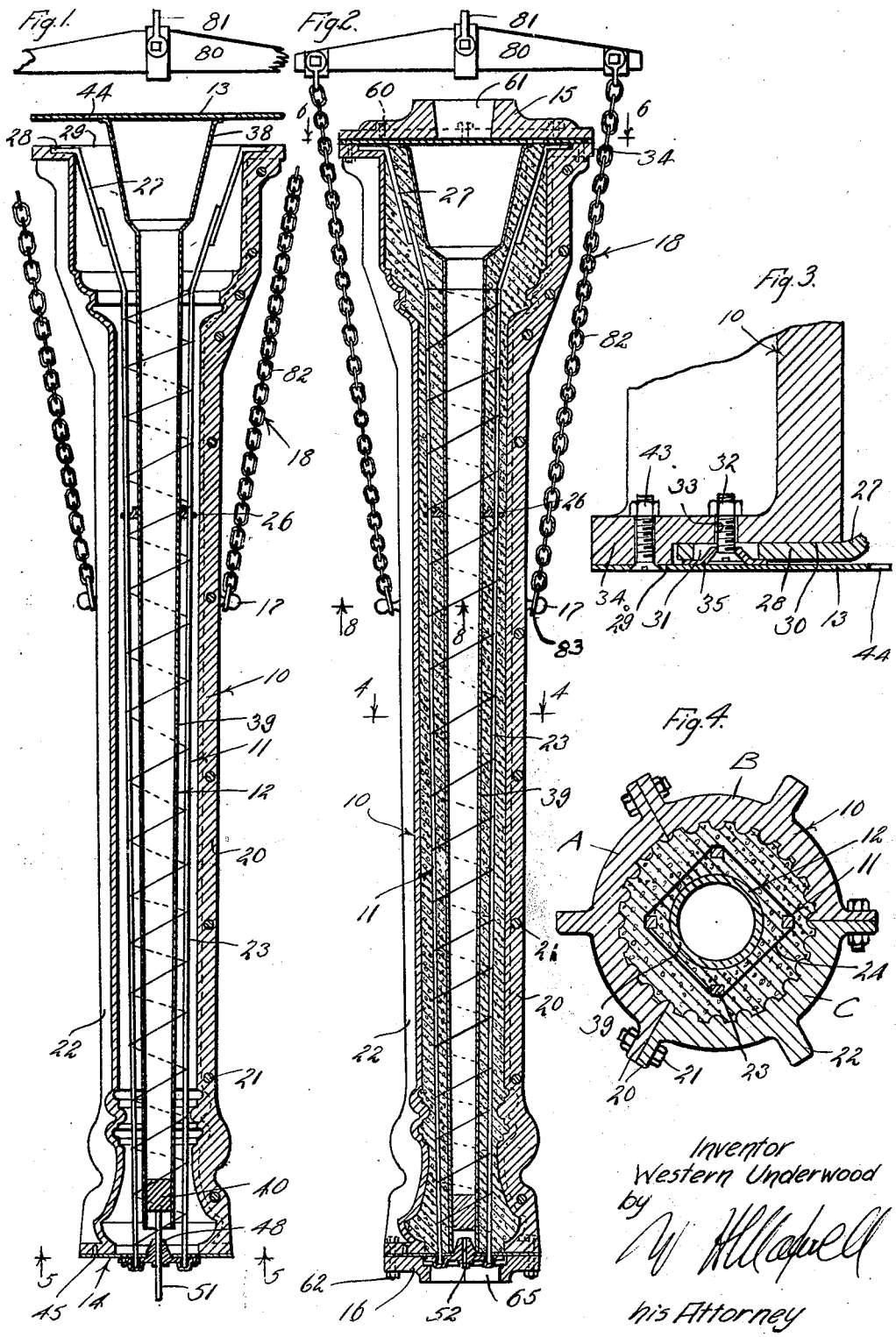
Inventor
Western Underwood
by
his Attorney Jan. 29, 1929.  W. UNDERWOOD  1,700,522
MOLD CONSTRUCTION
Filed Dec. 14, 1927   2 Sheets-Sheet 2
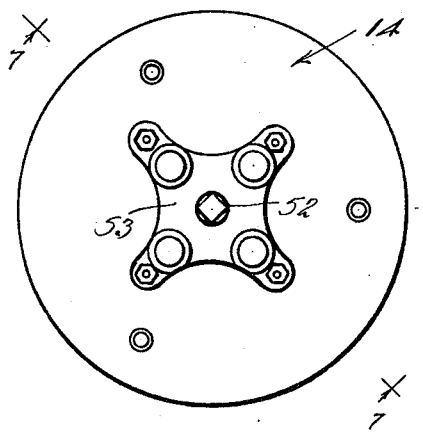
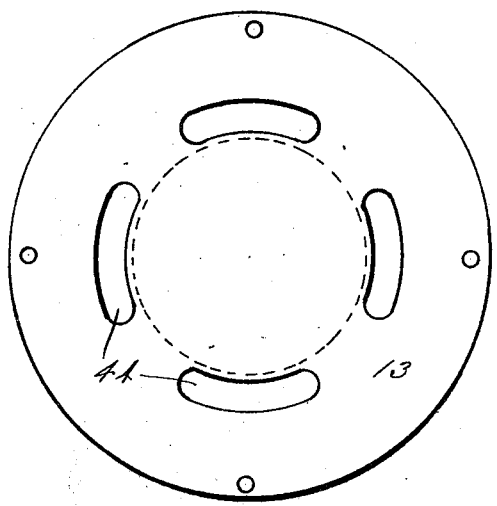
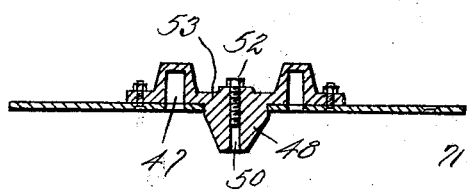
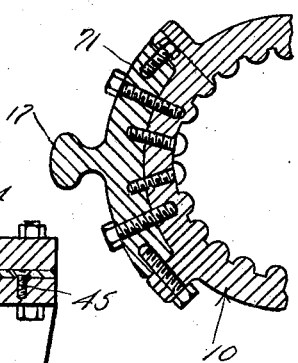
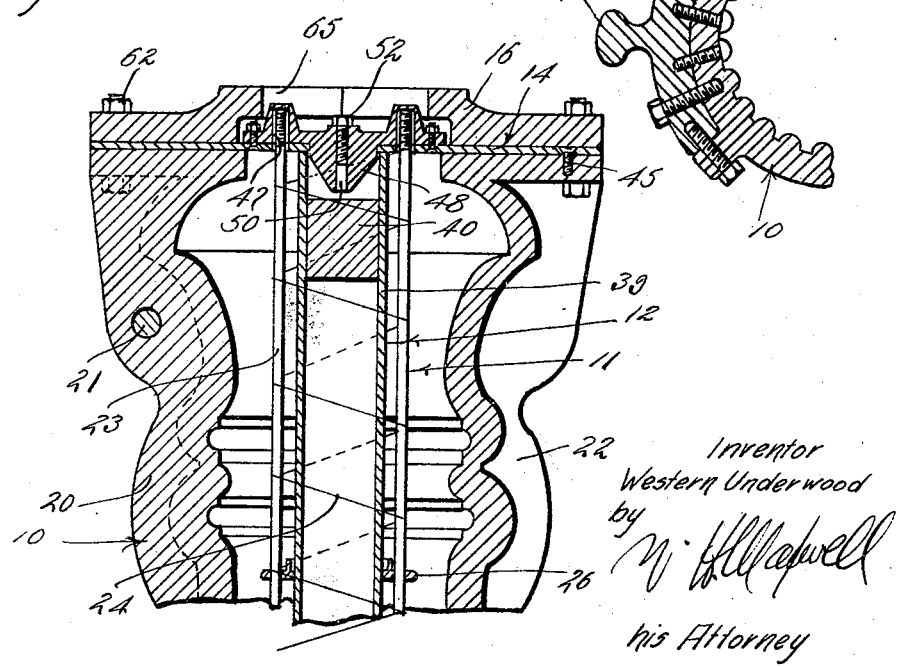
Inventor
Western Underwood
by
his Attorney Patented Jan. 29, 1929.

1,700,522

UNITED STATES PATENT OFFICE.

WESTERN UNDERWOOD, OF SANTA MONICA, CALIFORNIA, ASSIGNOR TO LA LUX MANUFACTURING COMPANY, OF LOS ANGELES, CALIFORNIA, A CORPORATION OF CALIFORNIA.

MOLD CONSTRUCTION.

Application filed December 14, 1927. Serial No. 239,913.

This invention has to do with a mold construction and it is a general object of the invention to provide an improved arrangement and construction of parts in a mold for use in forming monolithic or cementitious products.

Various cementitious or monolithic products are formed in molds and by processes which involve operating the molds in various manners. For purpose of example, I will refer to molds of the type used in the formation of monolithic columns or posts. Molds of this type are handled in various manners following various methods of manufacture; for instance, in some cases they are revolved for the purpose of properly packing the plastic material in them. In the case of the process set forth in my co-pending application, entitled Method of forming hollow, reinforced posts, Serial No. 239,914, filed on even date herewith,—the molds are vibrated and also rotated.

It is a primary object of this invention to provide a mold suitable for the formation of a monolithic post or column having a core which provides the post with a central longitudinal opening of a definite size.

Another object of this invention is to provide a simple, practical and effective construction and arrangement of parts whereby a core is accurately and effectively supported within a mold.

A further object of the invention is to provide a structure of the character just mentioned which allows the material to be molded, to be conveniently filled or packed into the mold while the core is definitely and positively held in place in the mold.

It is another object of this invention to provide an effective and improved means of supporting a reinforcement within a mold of the type mentioned whereby the reinforcement is definitely and accurately positioned in the finished product.

It is another object of this invention to provide a mold construction whereby a longitudinal reinforcement is held in the mold so that it is accurately positioned in the finished product and is free of false or induced strains.

A further object of this invention is to provide means whereby the mold can be handled conveniently and with a minimum of effort.

It is another object of the invention to provide a simple, practical and effective construction whereby the mold is adapted to machines or apparatus that may be used in handling it during the course of forming the finished product.

The various objects and features of my invention will be best and more fully understood from the following description of a typical preferred form and application of the invention throughout which description I refer to the accompanying drawings in which:

Fig. 1 is a longitudinal, detailed sectional view of the construction provided by my invention showing it in course of being assembled to receive the material to be molded;

Fig. 2 is a view similar to Fig. 1, showing the mold completely assembled and filled;

Fig. 3 is an enlarged, detailed sectional view taken at one end of the construction showing the manner in which I attach the reinforcement to the body of the mold and apply the core carrying plate to the body of the mold;

Fig. 4 is an enlarged, detailed transverse sectional view of the construction, being a view taken as indicated by line 4—4 on Fig. 2;

Fig. 5 is an enlarged end elevation taken as indicated by line 5—5 on Fig. 1;

Fig. 6 is an enlarged end view taken on line 6—6 on Fig. 2;

Fig. 7 is a sectional view taken as indicated by line 7—7 on Fig. 5;

Fig. 8 is an enlarged, detailed sectional view taken as indicated by line 8—8 on Fig. 2;

Fig. 9 is an enlarged view of one end of the mold showing the parts completely assembled.

The construction provided by this invention includes, generally, a body 10, forming the main part of the mold, a reinforcing structure 11 to be arranged in the body so that it is cast in the finished product, a core 12 to be arranged in the body to form a central longitudinal opening through the finished product, a core mounting or carrying plate 13 fixed to one end of the core and adapted to be connected to one end of the mold body, a cover plate 14 adapted to be applied to the other end of the body, mounting plates 15 and 16 to be applied to the ends of the body to facilitate mounting of the structure in an operating machine, or the like, projecting trunnion 17 on the body 10, and a sling 18 for engaging the trunnions.

The body 10 is a hollow, elongate structure having its interior finished or fashioned to give the desired shape or contour to the finished product. In view of the fact that the present invention is particularly suited to molds for posts or columns, I have disclosed a body 10 adapted to form an ornamental post suitable for use in a lighting standard or electrolier. It is to be understood, of course, that the body 10 may be of any desired proportions and that the interior of the body may be made to give the finished product any desired design. The body 10 is of sectional construction, that is, it is divided along longitudinal lines into a plurality of sections. The particular body illustrated is divided into three longitudinal sections A, B and C. The abutting edges of all joining sections are provided with outwardly projected flanges 20 to receive bolts 21, or the like, whereby the sections are connected or held together in an assembled position. In practice, suitable reinforcing flanges or ribs 22 can be provided on the exterior of the body sections to strengthen or reinforce them. I have found it practical to form the body sections of aluminum and to connect the sections by means of bolts 21, spaced along the body substantially, as shown in Figs. 1 and 2 of the drawing. The body 10 illustrated in the drawings, being designed to form an ornamental post or electrolier standard, is different at its two ends, one end being what I may term the base end, and the other end the head end. The body is larger at the base end than at the head end.

The reinforcement 11 to be cast or embedded in the finished product may vary in design and construction, it being preferred to form it of a plurality of longitudinal rods 23, one or more transverse ties 24 joining the rods, and one or more spacing rings 26 operable to hold the rods 23 spaced apart and in the desired position in the body being molded. In the construction illustrated, the rods 23 are provided at the base end of the structure with foot brackets 27 having outwardly projecting parts 28 adapted to be attached directly to the base end of the body 10 and to project from the finished product as a means for attaching the product to a foundation, or the like. The brackets 28 are preferably formed of comparatively heavy stock and are fixed, for instance welded, to the rods which may be lighter. The rods 23 may be suitable reinforcing stock, for instance, rods square in cross section and twisted longitudinally. In accordance with my invention, the base end 29 of the body 10 is provided with recesses or sockets 30 to receive the projecting parts 28 of the brackets. The projecting parts 28 are provided with openings 31 adapted to receive mounting bolts projecting from the foundation on which the post is to be mounted. For the purpose of attaching the brackets to the body of the mold, I arrange suitable bolts 32 through the openings 31 in the parts 28 and through openings 33 in the end of the body 10. The head end of the body is provided with an enlargement or flange-like part 34 to accommodate the sockets 30 and the other parts of the construction, as will be hereinafter described. The openings 31 in the projecting parts 28 of the brackets are larger than the heads of the bolts 32, and therefore I provide counter-sunk washers 35 to engage the parts 28 and fit the openings 31 to receive the heads of the bolts 32. This construction is clearly illustrated in Fig. 3 of the drawing. The longitudinal rods 23 of the reinforcement being thus attached to the base end of the body are definitely and positively held in position at this end of the body. The rods 32 extend longitudinally through the body to the head end thereof where they are guided in the proper position by the cover plate 14, as will be hereinafter described.

The guide ring 26 is an annular member fitting around the core 12 and having openings which pass the rods 23. The rods 23 in thus engaging the ring 26 are held in definite spaced relation and in the desired position to be cast in the finished product. It is to be understood that any desired number of spacing rings may be provided in the reinforcement and that they may be located at the desired point or points longitudinally of the structure. The transverse ties 24 are preferably in the form of one or more wires wrapped around the several rods 23 in a manner such as I have illustrated in Figs. 1 and 2 of the drawings.

The core 12 is provided to form a central longitudinal opening through the post and to engage the guide ring of the reinforcement so that the reinforcement is definitely held in position in the body. The core is carried by or fixed to the core carrying plate 13 and is proportioned and shaped to form the desired opening in the post. In accordance with standard practice, it is desired to provide an engaged opening in the base of the post, therefore the core has a large part 38 at its base end. A comparatively long, slightly tapered part 39 projects from the enlarged part 38 to the head end of the mold to form the desired opening through the post. The parts 38 and 39 of the core may be metal and tubular in form as shown in the drawings. In this case, the core carrying plate 13 closes the core at the base end while a plug 40 is arranged in the head end of the core as a closure, and as a stop to be engaged in driving or forcing the core from the cast post. In practice, the plug 40 is formed of wood, and is located in the part 39 of the core somewhat inward of the head end thereof.

The core carrying plate 13 is permanently attached to the large or base part 38 of the core and is in the form of a flat plate projecting radially from the base end of the core to engage or seat on the base end 29 of mold body 10. The plate 13 and flange part 34 of the body are provided with registering openings to receive bolts 43 which operate to connect the plate 13 to the base end of the mold. These openings in the plate 13 and body of the mold are, of course, related so that the bolts 43 connect the plate 13 with the mold body so that the base end of the core is held in the desired position in the base end of the body. In the preferred construction, the heads of the bolts 43 are counter-sunk in the plate 13 so that they do not project from the plate. In accordance with my invention, the plate 13 is provided with one or more openings 44 registering or opening into the interior of the body and through which the material to be molded can be introduced into the body. These openings 44 are clearly illustrated in Fig. 6 of the drawing.

The cover plate 14 is applied to the head end of the body and may be a flat metal plate adapted to be attached to the head end of the body by means of screws 45, or the like. In the preferred construction, the head ends of the screws 45 are counter-sunk in the cover plate 14 so that they do not project therefrom. In accordance with my invention, the cover plate 14 has means for guiding the head ends of the reinforcement rods 23. In the preferred construction, the cover plate is provided with sockets 47 which slidably or freely receive the head ends of the reinforcement rods 23. In practice, it is usually desired to have the head ends of the reinforcement rods threaded and projecting from the head end of the post as a means of attaching other parts or fixtures to the post. In the drawings, I have shown the threaded projecting ends of the reinforcement rods extending into the sockets 47 to be guided or supported in the desired position at the head end of the structure but not held to be under any undue or unnatural strain. By allowing the head ends of the rods 23 to extend freely into the sockets 47, the rods 43 are held or spaced definitely in the structure but are not strained. This is an important feature of my invention, as it allows the reinforcing rods 23 to be set or cast in the finished product under natural conditions, thus assuring a proper and permanent bond between the molded material and rods. If the reinforcing rods are put under a false strain, which strain is released after the post is formed, there is a tendency for a weakened condition, as there is immediately a tendency to break the bond between the rods and the molded matter.

The cover plate 14 is further provided with means for holding the head end of the core centrally or in the desired position in the head end of the structure. This means may include a projection 48 on the inner side of the plate 14 adapted to extend or fit into the end of the core part 39. The projection 48 is preferably tapered to facilitate guiding the head end of the core onto it and may be proportioned to accurately fit the head end of the core when the parts are fully assembled as shown in Fig. 9. In handling the mold, it is customary to insert the core after the reinforcement has been placed and in order to facilitate the proper positioning of the core on the projection 47 as the core is inserted from the base end of the body, I provide a central opening 50 through the cover or through the projection 48 so that a guide rod 51 can be inserted through the cover to project inwardly from the projection 48 and receive the head end of the core as shown in Fig. 1, and guide it onto the projection 48. When the core is in place, the guide rod 51 can be removed and the hole 50 closed by suitable plug 52. In the preferred construction, the cover 14 is formed of two parts, a sheet metal plate and a casting 53 provided with the sockets 47 and the projection 48. In this case, the plate is, of course, provided with suitable openings to register with the parts of the casting as shown in Fig. 9.

The plates 15 and 16 are applied to the ends of the structure over the plates 13 and 14, respectively, and are adapted to fit or accommodate the apparatus or machines in which the mold is to be handled. In the particular case illustrated, the plate 15 is adapted to be secured to the base end of the body over plate 13 through bolts 60, and is provided with a central socket 61 to receive a spindle or center of a suitable mold handling machine. The plate 15, in accordance with my invention, is made to cover the openings 44 in the plate 13 and in practice is applied to the structure after the mold has been completely filled through the openings 44.

The plate 16 is applied to the head end of the mold over the plate 14 and is secured by means of bolts 62. The plate 16 is recessed to accommodate the projecting parts of cover 14 and is provided with a central socket 65 to receive a spindle or part of a mold handling machine. In the case illustrated, socket 65 is made polygonal to receive a correspondingly shaped drive member, or the like, of a mold handling machine.

The means 17 provided to receive the sling 18 includes trunnions 17 projecting from diametrically opposite sides of the body and located at approximately the center of balance or gravity of the structure when the structure is filled. In the construction illustrated, the trunnions 17 are provided on plates 71 secured to the mold sections in a manner such as illustrated in Fig. 8 of the drawings. The sling 18 provided to handle the mold through the trunnions 17 includes a beam 80 to be supported through a suitable fitting 81 and chains 82, or the like, extending from the end beam 80 and provided at their lower ends with rings 83 to be applied to the trunnions 70. The chains 82 are preferably of equal length and sufficiently long to allow the entire mold to turn or swing under the beam 80. It will be apparent that this construction provides for conveniently handling or turning the mold end for end.

From the foregoing description, it is believed that the general construction and mode of operation will be fully understood. In practice, I find it convenient to assemble or connect two of the body sections, apply the cover 14 thereto and arrange the reinforcement 11 in place. The other body section is then arranged in place and the base end of the reinforcement made secure with the base end of the body through the bolts 32. The core is then arranged in place, which operation is facilitated by the guide rod 51. With the core in place and the plate 13 secured to the base end of the body, the mold is in condition to be filled. When the mold is full and the plates 15 and 16 are applied, the mold is ready to be handled by a suitable machine or in whatever manner may be desired. It is apparent plate 16 can be applied either before or after the mold is filled.

Having thus described the invention, what I claim is:

1. A post mold including an elongate sectional body, a cover for one end of the body, a core, a plate carrying the core and adapted to be attached to the other end of the body, the plate having an opening to admit material into the body, and a mounting plate to be applied over the core carrying plate and close the opening therein.

2. A post mold including an elongate sectional body, a cover for one end of the body, a core, and a plate carrying the core and adapted to be attached to the other end of the body so that the core extends through the body to the cover, the core and cover having inter-engaging parts whereby the core is guided at the cover.

3. A post mold including an elongate sectional body, a cover for one end of the body, a core, an inwardly extending projection on the cover, and a plate carrying the core and adapted to be attached to the other end of the body so that the core extends through the body to the cover, the core engaging the projection to be held in place in the body.

4. A post mold including an elongate sectional body, a cover for one end of the body, a core, an inwardly extending projection on the cover, and a plate carrying the core and adapted to be attached to the other end of the body so that the core extends through the body to the cover, the core having a socket in its end to receive the projection.

5. A post mold including an elongate sectional body, a cover for one end of the body, an inwardly extending projection on the cover, there being an opening through the projection through which a member can be arranged to project into the body, a core, and a plate carrying the core and adapted to be attached to the other end of the body, the core having a socket in its end to receive the projection.

6. A post mold including a sectional body, a cover to be attached to one end of the body, a core, a plate carrying the core and adapted to be attached to the other end of the body so that the core extends through the body and engages the cover, and mounting plates to be attached to the ends of the body over the cover and core carrying plate.

7. A post mold including a sectional body, a cover to be attached to one end of the body, a core, a plate carrying the core and adapted to be attached to the other end of the body so that the core extends through the body and engages the cover, the plate having an opening to admit material into the body, and mounting plates to be attached to the ends of the body over the cover and core carrying plate, the opening in the core carrying plate being closed by the mounting plate arranged over the core carrying plate.

8. A post mold including a body, a cover for one end of the body and having a plurality of sockets, a reinforcement having longitudinal parts attached to the other end of the body and extending freely into the sockets, and means for closing said other end of the body.

9. A post mold including a body, a cover for one end of the body and having a plurality of sockets, a reinforcement having longitudinal parts attached directly to the other end of the body and extending freely into the sockets, and means for closing said other end of the body.

10. A post mold including a body, a cover for one end of the body and having a plurality of sockets, a reinforcement having longitudinal parts attached to the other end of the body and extending freely into the sockets, a core, and a plate carrying the core and attached to said other end of the body over the reinforcement parts.

11. A post mold including a body, a cover for one end of the body and having a plurality of sockets, a reinforcement having longitudinal parts attached to the other end of the body and extending freely into the sockets, a core, and a plate carrying the core and attached to said other end of the body over the reinforcement parts, the plate having an opening to admit material into the body.

12. A post mold including a body, a cover for one end of the body and having a plurality of sockets, a reinforcement having longitudinal parts attached to the other end of the body and extending freely into the sockets, a core, a plate carrying the core and attached to said other end of the body over the reinforcement parts, the plate having an opening to admit material into the body, and mounting plates attached to the ends of the body over the cover and core carrying plate.

13. A post mold including a body, a cover for one end of the body and having a plurality of sockets, a reinforcement having longitudinal parts attached to the other end of the body and extending freely into the sockets, a core, cooperating parts on the cover and core whereby the core is supported at the cover, and a plate carrying the core and attached to said other end of the body over the reinforcement parts.

14. A post mold including a body, a cover for one end of the body and having a plurality of sockets, a reinforcement having longitudinal parts attached to the other end of the body and extending freely into the sockets, a core having a socket in its end, a projection on the cover to extend into the socket in the core, and a plate carrying the core and attached to said other end of the body over the reinforcement parts.

15. A post mold including a body, a cover for one end of the body and having a plurality of sockets, a projection on the cover, a core having a socket at one end to receive the projection, a plate attached to the other end of the core and secured to the other end of the body, the plate having an opening to admit material into the body, a reinforcement having longitudinal parts extending freely into the sockets, brackets fixed to said parts and attached directly to said other end of the body under the plate, and a spacing ring engaging the core and supporting said parts intermediate their ends, and mounting plates applied over the cover and core carrying plate.

In witness that I claim the foregoing I have hereunto subscribed my name this 6th day of December, 1927.

WESTERN UNDERWOOD.